US012586549B2

(12) United States Patent
Chan et al.

(10) Patent No.: US 12,586,549 B2
(45) Date of Patent: Mar. 24, 2026

(54) IMAGE CONVERSION APPARATUS AND METHOD HAVING TIMING RECONSTRUCTION MECHANISM

(71) Applicant: REALTEK SEMICONDUCTOR CORPORATION, Hsinchu (TW)

(72) Inventors: Chun-Chieh Chan, Hsinchu (TW); Yu-Le Shen, Hsinchu (TW); Yan-Ting Ye, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 156 days.

(21) Appl. No.: 18/430,695

(22) Filed: Feb. 2, 2024

(65) Prior Publication Data

US 2024/0304165 A1 Sep. 12, 2024

(30) Foreign Application Priority Data

Mar. 7, 2023 (TW) ................................ 112108354

(51) Int. Cl.
*G09G 5/395* (2006.01)

(52) U.S. Cl.
CPC ....... *G09G 5/395* (2013.01); *G09G 2310/061* (2013.01); *G09G 2310/08* (2013.01)

(58) Field of Classification Search
CPC ............. G09G 5/395; G09G 2310/061; G09G 2310/08; G09G 5/006; G09G 5/12
See application file for complete search history.

(56) References Cited

U.S. PATENT DOCUMENTS 6,433,829 B1 * 8/2002 Nagamine ................ H04N 5/06 348/637
10,785,386 B1 * 9/2020 Chuang .................... H04N 5/06

FOREIGN PATENT DOCUMENTS

TW 200822714 A 5/2008
TW 202038599 A 10/2020

OTHER PUBLICATIONS

OA letter of a counterpart TW application (appl. No. 112108354) mailed on Apr. 3, 2024. Summary of the TW OA letter: 1. Claims 1, 8 and 10 are rejected as allegedly being unpatentable in view of cited reference 1 (TW202038599A) and cited reference 2 (TW200822714A). 2. Claims 2~7 and 9 are allowable. Correspondence bewteen claims of TW counterpart application and claims of US application: 1. Claims 1, 2-3, . . . , and 10 in TW counterpart application correspond to claims 1, 2-3, . . . and 10 in US application, respectively.

* cited by examiner

*Primary Examiner* — King Y Poon
*Assistant Examiner* — Patrick P Galera
(74) *Attorney, Agent, or Firm* — WPAT, PC

(57) ABSTRACT

The present disclosure discloses an image conversion apparatus having timing reconstruction mechanism. A receiving circuit receives a first interface image signal having input display data and horizontal blanking signals. A horizontal synchronization reconstruction circuit generates horizontal synchronization signals according to timings of the horizontal blanking signals. A vertical synchronization reconstruction circuit selects a predetermined timing of a predetermined signal between a frame initial timing and a display initial timing of the input display data, determines a timing of one of the horizontal synchronization signals behind and closest to the predetermined timing and generates a vertical synchronization signal accordingly. An image reconstruction circuit generates output display data according to the input display data and the horizontal synchronization signals. A transmission circuit integrates the horizontal synchronization signals and the vertical synchronization signal with the output display data being included in a second interface image signal to be outputted through a second interface.

15 Claims, 4 Drawing Sheets

400

IMAGE CONVERSION APPARATUS AND METHOD HAVING TIMING RECONSTRUCTION MECHANISM

BACKGROUND OF THE INVENTION

1. Field of the Invention

The present disclosure relates to an image conversion apparatus and an image conversion method having timing reconstruction mechanism.

2. Description of Related Art

Along with the progress of the technology, conventional image interfaces such as Video Graphics Array (VGA) and Digital Visual Interface (DVI) gradually disappear. DisplayPort (DP) and High Definition Multimedia Interface (HDMI) become two mainstream image interfaces that replace the convention interfaces.

When different image interfaces are supported by different equipments, an image conversion apparatus is required to connect the equipments to convert the image formats corresponding to different image interfaces. However, under the condition that more and more possible image applications are presented, the equipments may operate under a variable refresh rate mode. When the equipment serving as a transmission terminal does not provide corresponding timing information, the image conversion apparatus may not be able to establish the correct timing such that the converted image can not be processed by the receiving terminal.

SUMMARY OF THE INVENTION

In consideration of the problem of the prior art, an object of the present disclosure is to provide an image conversion apparatus and an image conversion method having timing reconstruction mechanism.

The present invention discloses an image conversion apparatus having timing reconstruction mechanism that includes a receiving circuit, a horizontal synchronization reconstruction circuit, a vertical synchronization reconstruction circuit, an image reconstruction circuit and a transmission circuit. The receiving circuit is configured to receive a first interface image signal through a first interface, wherein the first interface image signal includes input display data and a plurality of horizontal blanking signals. The horizontal synchronization reconstruction circuit is configured to generate a plurality of horizontal synchronization signals according to timings of the horizontal blanking signals. The vertical synchronization reconstruction circuit is configured to select a predetermined timing of a predetermined signal between a frame initial timing and a display initial timing of the input display data, to determine a timing of one of the horizontal synchronization signals that is behind and closest to the predetermined timing and generate a vertical synchronization signal accordingly. The image reconstruction circuit is configured to generate output display data according to the input display data and the horizontal synchronization signals. The transmission circuit is configured to, according to the timings of the horizontal synchronization signals and the vertical synchronization signal, integrate the horizontal synchronization signals and the vertical synchronization signal with the output display data such that an integrated result is included in a second interface image signal to be outputted through a second interface.

The present invention also discloses an image conversion method having timing reconstruction mechanism that includes steps outlined below. A first interface image signal is received through a first interface by a receiving circuit, wherein the first interface image signal includes input display data and a plurality of horizontal blanking signals. A plurality of horizontal synchronization signals are generated according to timings of the horizontal blanking signals by a horizontal synchronization reconstruction circuit. A predetermined timing of a predetermined signal between a frame initial timing and a display initial timing of the input display data is selected by a vertical synchronization reconstruction circuit, to determine a timing of one of the horizontal synchronization signals that is behind and closest to the predetermined timing and generate a vertical synchronization signal accordingly. Output display data is generated according to the input display data and the horizontal synchronization signals by an image reconstruction circuit. According to the timings of the horizontal synchronization signals and the vertical synchronization signal, the horizontal synchronization signals and the vertical synchronization signal are integrated with the output display data by a transmission circuit such that an integrated result is included in a second interface image signal to be outputted through a second interface.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image conversion apparatus and an image conversion method having timing reconstruction mechanism to perform timing reconstruction according to horizontal blanking signals and blanking end signals in a first interface image signal related to the timing of input display data to generate horizontal synchronization signals and a vertical synchronization signal in a second interface image signal such that output display data can be transmitted according to the timing of the horizontal synchronization signals and the vertical synchronization signal. A correct image conversion result can be obtained.

Figure 1:
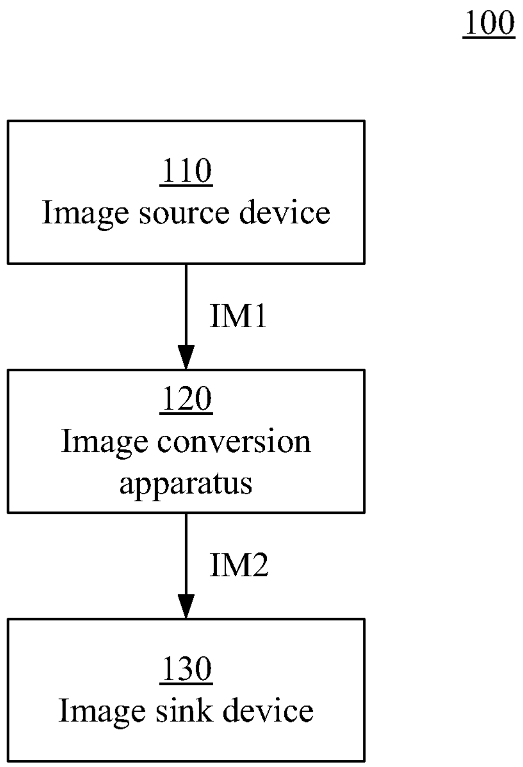
FIG. 1 illustrates a block diagram of an image system according to an embodiment of the present invention.

Reference is now made to FIG. 1. FIG. 1 illustrates a block diagram of an image system 100 according to an embodiment of the present invention. The image system 100 includes an image source device 110, an image conversion apparatus 120 and an image sink device 130.

In an embodiment, the image source device 110 is such as, but not limited to a computer host and has a first interface used to perform image transmission. The image sink device 130 can be such as, but not limited to a display device and has a second interface used to perform image transmission. In an embodiment, the first interface is DisplayPort (DP) and the second interface is High Definition Multimedia Interface (HDMI).

In order to allow a first interface image signal IM1 provided by the image source device 110 to be received and processed by the image sink device 130, the image conversion apparatus 120 performs format conversion from the first interface to the second interface on the first interface image signal IM1 to generate a second interface image signal IM2. As a result, the image sink device 130 can receive the second interface image signal IM2 to perform processing such as but not limited to image playback.

It is appreciated that the implementation of the image source device 110 and the image sink device 130 and the implementation of the first interface and the second interface described above are merely an example. The present invention is not limited thereto.

Under the condition that the image source device 110 and the image sink device 130 support variable refresh rate (VRR) mode, the timing of the display data included by the first interface image signal IM1 provided by the image source device 110 varies when the refresh rate varies. For example, the frame refresh rate of the image source device 110 may increase from 60 Hz to 120 Hz. When the image source device 110 does not provide certain information related to the timing of the display data, e.g., Adaptive Sync information, the image conversion apparatus 120 may reconstruction the timing of the display data by using timing reconstruction mechanism to further generate the second interface image signal IM2 having the correct timing.

Figure 2:
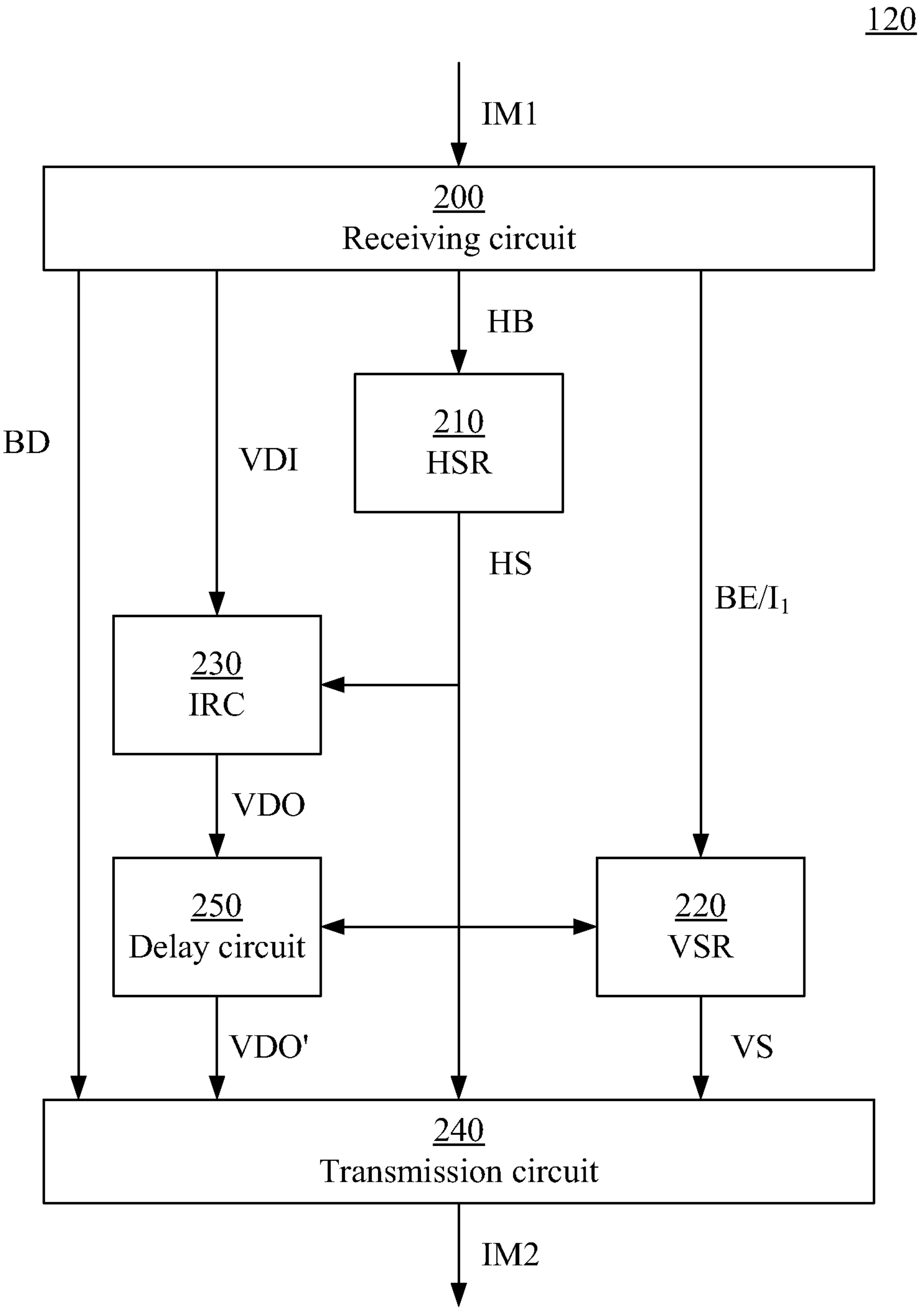
FIG. 2 illustrates a block diagram of the image conversion apparatus having timing reconstruction mechanism according to an embodiment of the present invention.
Figure 3:
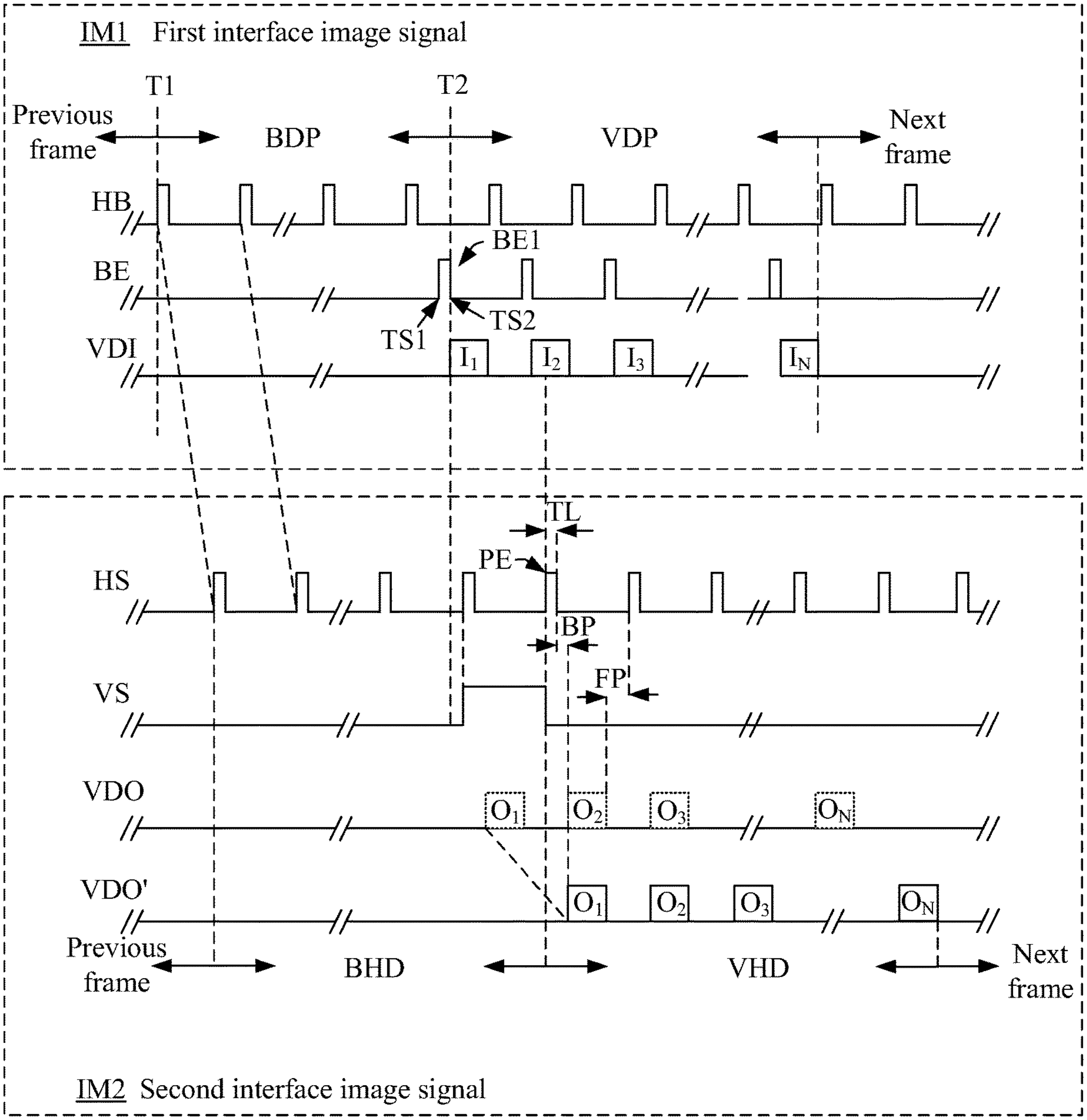
FIG. 3 illustrates a timing diagram of the first interface image signal and the second interface image signal according to an embodiment of the present invention.

Reference is now made to FIG. 2 and FIG. 3 at the same time. FIG. 2 illustrates a block diagram of the image conversion apparatus 120 having timing reconstruction mechanism according to an embodiment of the present invention. FIG. 3 illustrates a timing diagram of the first interface image signal IM1 and the second interface image signal IM2 according to an embodiment of the present invention. The operation mechanism of the image conversion apparatus 120 is described in the following paragraphs in accompany with FIG. 2 and FIG. 3.

As illustrated in FIG. 2, the image conversion apparatus 120 includes a receiving circuit 200, a horizontal synchronization reconstruction circuit 210 (abbreviated as HSR in FIG. 2), a vertical synchronization reconstruction circuit 220 (abbreviated as VSR in FIG. 2), an image reconstruction circuit 230 (abbreviated as IRC in FIG. 2) and a transmission circuit 240.

The receiving circuit 200 receives the first interface image signal IM1 through the first interface. As illustrated in FIG. 3, the first interface image signal IM1, corresponding to each of a plurality of frames, includes input display data VDI, a plurality of horizontal blanking signals HB, a plurality of blanking end signals BE and blank data BD (only labeled in FIG. 2). The first one of the blanking end signals BE is labeled as the first blanking end signal BE1. In an embodiment, the blank data BD may include such as, but not limited to audio, info frame or other information.

In an embodiment, a frame transmission process in turns includes a blank period BDP and an image period VDP. The blank period BDP is configured to transmit other display-related information and the image period VDP is configured to transmit the input display data VDI includes the actual image content. A previous frame transmission process is in front of the blank period BDP. A next frame transmission process is behind the image period VDP. In an embodiment, a frame includes pixels arranged as an array. The input display data VDI includes a plurality of input line data $I_1 \sim I_N$ corresponding to pixels values of a plurality of rows of pixels included in the frame.

The horizontal blanking signals HB are signals presented periodically and having fixed positions in a transmission time period. In an embodiment, each of the horizontal blanking signals HB includes a blanking start signal, a vertical blanking identification (VB-ID) signal, an image time stamp (Mvid) signal, an audio time stamp (Maud) signal or a combination thereof.

The first blanking end signal BE1 marks the end of the blank period BDP and the beginning of the image period VDP. As a result, the receiving circuit 200 configures the first blanking end signal BE1 as a starting point, to start to receive the input line data $I_1 \sim I_N$ each corresponding to one of the blanking end signals BE. In an embodiment, the receiving circuit 200 configures an ending edge, which is a falling edge in the present embodiment, of the first blanking end signal BE1 as the starting point. In another embodiment, the receiving circuit 200 may configure the beginning edge, which is a rising edge, of the first blanking end signal BE1 as the starting point.

The horizontal synchronization reconstruction circuit 210, for each of the frames, generates a plurality of horizontal synchronization signals HS according to timings of the horizontal blanking signals HB. In an embodiment, due to the time that the horizontal synchronization reconstruction circuit 210 requires to perform processing, a small amount of delay may be presented between each of the horizontal synchronization signals HS and a corresponding one of the horizontal blanking signals HB.

The vertical synchronization reconstruction circuit 220 simultaneously receives the blanking end signals BE and the horizontal synchronization signals HS generated by the horizontal synchronization reconstruction circuit 210. The vertical synchronization reconstruction circuit 220, for each of the frames, selects a predetermined timing of a predetermined signal between a frame initial timing T1 and a display initial timing T2 of the input display data VDI, to determine a timing of one of the horizontal synchronization signals HS that is behind and closest to the predetermined timing and generate a vertical synchronization signal VS. In an embodiment, a time length of the vertical synchronization signal VS equals to a time length between two neighboring the horizontal synchronization signals HS.

In different embodiments, the predetermined signal can be the first blanking end signal BE1 or the first input line data $I_1$. The predetermined timing can be a rising edge timing TS1 or a falling edge timing TS2 of the first blanking end signal BE1, or can be the display initial timing T2 that the first input line data $I_1$ corresponds to.

The image reconstruction circuit 230, for each of the frames, generates output display data VDO according to the input display data VDI and the horizontal synchronization signals HS. In an embodiment, the output display data VDO includes a plurality of output line data $O_1 \sim O_N$ corresponding to the pixel values of the plurality of rows of pixels of the frame describe above. The image reconstruction circuit 230 configures the vertical synchronization signal VS as a starting point to start to output the output line data $O_1 \sim O_N$ each corresponding to one of the horizontal synchronization signals HS.

In an embodiment, the horizontal synchronization signals HS has a starting edge and a signal time length, e.g., the starting edge PE and the signal time length TL labeled in FIG. 3. Further, each of the horizontal synchronization signals HS has a front porch time length in front and a back porch time length behind, e.g., the front porch time length FP and the back porch time length BP labeled in FIG. 3.

The image reconstruction circuit 230 configures an output time point of each of the plurality of output line data $O_1$~$O_N$ (e.g., the output line data $O_2$) to have a first difference from the starting edge PE of a corresponding one of the horizontal synchronization signals HS, in which the first difference is a sum of the signal time length TL and the back porch time length BP. The image reconstruction circuit 230 further configures an ending time point of each of the plurality of output line data $O_1$~$O_N$ (e.g., the output line data $O_2$) to have a second difference from the starting edge PE of a next one of the horizontal synchronization signals HS, in which the second difference equals the front porch time length FP.

In an embodiment, the image conversion apparatus 120 further includes a delay circuit 250 to perform delay processing on the output display data VDO such that the plurality of output line data $O_1$~$O_N$ is delayed, relative to the vertical synchronization signal VS, by a predetermined amount of time to be outputted, in which the predetermined amount of time is at least a time length between neighboring two of the horizontal synchronization signals HS so as to generate the delayed output display data VDO'.

In FIG. 3, take the output line data $O_1$ as an example, the difference between the output line data $O_1$ included by the output display data VDO' and the output line data $O_1$ included by the output display data VDO generated due to the delay process is the time length between the neighboring two of the horizontal synchronization signals HS. The time length between the neighboring two of the horizontal synchronization signals HS equals to the time length for transmitting a piece of output line data, which is a sum of the time length of the signal time length TL, the front porch time length FP, the back porch time length BP and the output line data $O_1$.

In an embodiment, when no delay is performed on the output display data VDO, the first piece of the output line data, which is the output line data $O_1$, is outputted by configuring the starting edge of the vertical synchronization signal VS as the starting point. More specifically, the first piece of the output line data is transmitted within the timing that the vertical synchronization signal VS is transmitted. When the second interface is HDMI, the protocol does not allow the vertical synchronization signal VS and the output line data $O_1$ to be transmitted simultaneously such that a timing violation occurs to the output display data VDO that is not delayed.

Under such a condition, the ending edge, which is the falling edge in the present embodiment, of the vertical synchronization signal VS corresponds to a blank period BHD and an image period VHD of a frame. For the delayed output display data VDO', the first piece of the output line data, which is the output line data $O_1$, is outputted by configuring the ending edge of the vertical synchronization signal VS as the starting point. Such a configuration separates the output line data $O_1$ from the vertical synchronization signal VS to avoid the occurrence of timing violation.

It is appreciated that the above embodiment is described by performing delay for a time length between the neighboring two of the horizontal synchronization signals HS as an example. In practical implementation, the delay circuit 250 may perform delay processing such that the output line data $O_1$~$O_N$ is delayed, relative to the vertical synchronization signal VS, by more than one time lengths between neighboring two of the horizontal synchronization signals HS to be outputted. The present invention is not limited thereto.

The transmission circuit 240, for each of the frames, integrates the horizontal synchronization signals HS and the vertical synchronization signal VS with the blank data BD and the output display data VDO' according to the timing of the horizontal synchronization signals HS and the vertical synchronization signal VS such that the integrated result is included in the second interface image signal IM2 to be outputted through the second interface. In an embodiment, the term "integrate" means that the transmission circuit 240 may process the horizontal synchronization signals HS, the vertical synchronization signal VS, the blank data BD and the output display data VDO' to generate the packets matching the protocol of HDMI.

Under the variable refresh rate mode, since the transmission data amount of the image period VDP is the same, the image source device mainly adjusts the length of the blank period BDP in order to vary the frame refresh rate. If the image source device is able to provide the information related to the timing of the image period VDP under the variable refresh rate mode, the image conversion apparatus 120 is able to identify the timing of the image period VDP through such information. However, in some approaches, the image source device does not provided such information such that the image conversion apparatus 120 can not identify the timing of the image period VDP. An incorrect image conversion result may occur.

The image conversion apparatus having timing reconstruction mechanism of the present invention performs timing reconstruction according to horizontal blanking signals and blanking end signals in a first interface image signal related to the timing of input display data to generate horizontal synchronization signals and a vertical synchronization signal in a second interface image signal such that output display data can be transmitted according to the timing of the horizontal synchronization signals and the vertical synchronization signal. A correct image conversion result can be obtained.

More specifically, even if the image source device does not provide the information related to the timing of the image period VDP, the image conversion apparatus is still able to transmit the output display data included in the second interface image signal with the correct timing.

In an embodiment, the image conversion apparatus of the present invention may not activate the timing reconstruction mechanism described above when the image source device operates under a predetermined fixed refresh rate mode and only activates the timing reconstruction mechanism when the image source device operates under the variable refresh rate mode. The present invention is not limited thereto.

Figure 4:
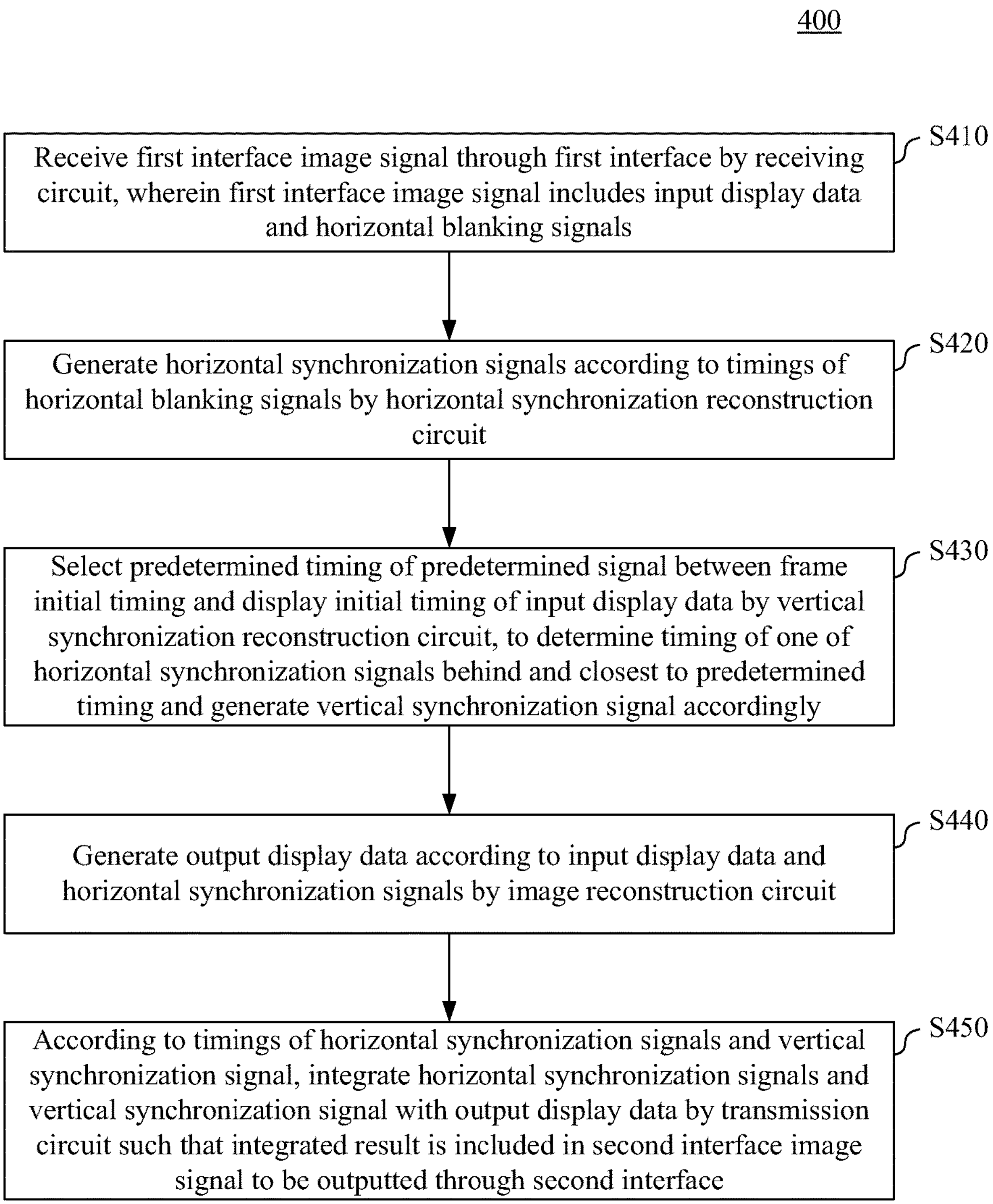
FIG. 4 illustrates a flow chart of an image conversion method having timing reconstruction mechanism according to an embodiment of the present invention.

Reference is now made to FIG. 4. FIG. 4 illustrates a flow chart of an image conversion method 400 having timing reconstruction mechanism according to an embodiment of the present invention.

Besides the apparatus described above, the present invention further discloses the image conversion method 400 that can be used in such as, but not limited to the image conversion apparatus 120 illustrated in FIG. 2. An embodiment of the image conversion method 400 is illustrated in FIG. 4 and includes the steps outlined below.

In step S410, the first interface image signal IM1 is received through the first interface by the receiving circuit 200, wherein the first interface image signal IM1 includes the input display data VDI and the horizontal blanking signals HB.

In step S420, the horizontal synchronization signals HS are generated according to timings of the horizontal blanking signals HB by the horizontal synchronization reconstruction circuit 210.

In step S430, the predetermined timing of the predetermined signal between the frame initial timing T1 and the display initial timing T2 of the input display data VDI is selected by the vertical synchronization reconstruction circuit 220, to determine the timing of one of the horizontal synchronization signals HS that is behind and closest to the predetermined timing and generate the vertical synchronization signal VS accordingly.

In step S440, the output display data VDO is generated according to the input display data VDI and the horizontal synchronization signals HS by the image reconstruction circuit 230.

In step S450, according to the timings of the horizontal synchronization signals HS and the vertical synchronization signal VS, the horizontal synchronization signals HS and the vertical synchronization signal VS are integrated with the output display data VDO by the transmission circuit 240 such that the integrated result is included in the second interface image signal IM2 to be outputted through the second interface.

In an embodiment, in order to avoid the violation of the timing related to the second interface, the transmission circuit 240 integrates the horizontal synchronization signals HS and the vertical synchronization signal VS with the delayed output display data VDO' delayed by the delay circuit 250. Further, in an embodiment, the first interface image signal IM1 may include the blank data BD, such that the transmission circuit 240 integrates the horizontal synchronization signals HS and the vertical synchronization signal VS with the blank data BD and the output display data VDO'.

It is appreciated that the embodiments described above are merely an example. In other embodiments, it is appreciated that many modifications and changes may be made by those of ordinary skill in the art without departing, from the spirit of the invention. For example, in the embodiment in FIG. 3, each of the horizontal blanking signals HB, the blanking end signals BE, the horizontal synchronization signals HS and the vertical synchronization signal VS is illustrated as a high state level. However, in other embodiments, each of these signals can be a low state signal. The present invention is not limited thereto.

In summary, the image conversion apparatus and the image conversion method having timing reconstruction mechanism of the present invention perform timing reconstruction according to horizontal blanking signals and blanking end signals in a first interface image signal related to the timing of input display data to generate horizontal synchronization signals and a vertical synchronization signal in a second interface image signal such that output display data can be transmitted according to the timing of the horizontal synchronization signals and the vertical synchronization signal. A correct image conversion result can be obtained.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image conversion apparatus having timing reconstruction mechanism, comprising:

a receiving circuit configured to receive a first interface image signal through a first interface, wherein the first interface image signal comprises input display data and a plurality of horizontal blanking signals;

a horizontal synchronization reconstruction circuit configured to generate a plurality of horizontal synchronization signals according to timings of the horizontal blanking signals;

a vertical synchronization reconstruction circuit configured to select a predetermined timing of a predetermined signal between a frame initial timing and a display initial timing of the input display data, to determine a timing of one of the horizontal synchronization signals that is behind and closest to the predetermined timing and generate a vertical synchronization signal accordingly;

an image reconstruction circuit configured to generate output display data according to the input display data and the horizontal synchronization signals, wherein the output display data comprises a plurality of output line data, and the image reconstruction circuit configures the vertical synchronization signal as a starting point to start to output the plurality of output line data each corresponding to one of the horizontal synchronization signals;

a delay circuit configured to perform delay processing on the output display data such that the plurality of output line data is delayed, relative to the vertical synchronization signal, by a predetermined amount of time to be outputted, in which the predetermined amount of time is at least a time length between neighboring two of the horizontal synchronization signals; and a transmission circuit configured to, according to the timings of the horizontal synchronization signals and the vertical synchronization signal, integrate the horizontal synchronization signals and the vertical synchronization signal with the delayed output display data such that an integrated result is comprised in a second interface image signal to be outputted through a second interface.

2. The image conversion apparatus of claim 1, wherein the predetermined signal is a first blanking end signal of a plurality of blanking end signals, the predetermined timing is a rising edge timing or a falling edge timing of the first blanking end signal.

3. The image conversion apparatus of claim 2, wherein the input display data comprises a plurality of input line data, and the receiving circuit configures the first blanking end signal as a starting point to start to receive the plurality of input line data each corresponding to one of the blanking end signals.

4. The image conversion apparatus of claim 1, wherein the predetermined signal is first input line data of a plurality of input line data comprised by the input display data, the predetermined timing is the display initial timing that the first input line data corresponds to.

5. The image conversion apparatus of claim 1, wherein each of the horizontal synchronization signals has a starting edge and a signal time length, each of the horizontal synchronization signals has a front porch time length and a back porch time length, and the image reconstruction circuit configures an output time point of each of the plurality of output line data to have a first difference from the starting edge of a corresponding one of the horizontal synchronization signals, in which the first difference is a sum of the signal time length and the back porch time length;

the image reconstruction circuit further configures an ending time point of each of the plurality of output line data to have a second difference from the starting edge of a next one of the horizontal synchronization signals, in which the second difference equals the front porch time length.

6. The image conversion apparatus of claim 1, the horizontal blanking signals comprises a blanking start signal, a vertical blanking identification (VB-ID) signal, an image time stamp (Mvid) signal, an audio time stamp (Maud) signal or a combination thereof.

7. The image conversion apparatus of claim 1, wherein the first interface image signal further comprises blank data, the transmission circuit integrates the horizontal synchronization signals and the vertical synchronization signal with the blank data and the output display data to be comprised in the second interface image signal to be outputted.

8. An image conversion method having timing reconstruction mechanism, comprising:

receiving a first interface image signal through a first interface by a receiving circuit, wherein the first interface image signal comprises input display data and a plurality of horizontal blanking signals;

generating a plurality of horizontal synchronization signals according to timings of the horizontal blanking signals by a horizontal synchronization reconstruction circuit;

selecting a predetermined timing of a predetermined signal between a frame initial timing and a display initial timing of the input display data by a vertical synchronization reconstruction circuit, to determine a timing of one of the horizontal synchronization signals that is behind and closest to the predetermined timing and generate a vertical synchronization signal accordingly;

generating output display data according to the input display data and the horizontal synchronization signals by an image reconstruction circuit, wherein the output display data comprises a plurality of output line data such that the image reconstruction circuit configures the vertical synchronization signal as a starting point to start to output the plurality of output line data each corresponding to one of the horizontal synchronization signals;

performing a delay processing on the output display data by a delay circuit such that the plurality of output line data is delayed, relative to the vertical synchronization signal, by a predetermined amount of time to be outputted, in which the predetermined amount of time is at least a time length between neighboring two of the horizontal synchronization signals; and according to the timings of the horizontal synchronization signals and the vertical synchronization signal, integrating the horizontal synchronization signals and the vertical synchronization signal with the delayed output display data by a transmission circuit such that an integrated result is comprised in a second interface image signal to be outputted through a second interface.

9. The image conversion method of claim 8, wherein the predetermined signal is a first blanking end signal of a plurality of blanking end signals, the predetermined timing is a rising edge timing or a falling edge timing of the first blanking end signal.

10. The image conversion method of claim 9, wherein the input display data comprises a plurality of input line data, the image conversion method further comprises:

configuring the first blanking end signal as a starting point by the receiving circuit to start to receive the plurality of input line data each corresponding to one of the blanking end signals.

11. The image conversion method of claim 8, wherein the predetermined signal is first input line data of a plurality of input line data comprised by the input display data, the predetermined timing is the display initial timing that the first input line data corresponds to.

12. The image conversion method of claim 8, wherein each of the horizontal synchronization signals has a starting edge and a signal time length, each of the horizontal synchronization signals has a front porch time length and a back porch time length, the image conversion method further comprises:

configuring an output time point of each of the plurality of output line data to have a first difference from the starting edge of a corresponding one of the horizontal synchronization signals by the image reconstruction circuit, in which the first difference is a sum of the signal time length and the back porch time length;

configuring an ending time point of each of the plurality of output line data to have a second difference from the starting edge of a next one of the horizontal synchronization signals by the image reconstruction circuit, in which the second difference equals the front porch time length.

13. The image conversion method of claim 8, the horizontal blanking signals comprises a blanking start signal, a vertical blanking identification (VB-ID) signal, an image time stamp (Mvid) signal, an audio time stamp (Maud) signal or a combination thereof.

14. The image conversion method of claim 8, wherein the first interface image signal further comprises blank data, the image conversion method further comprises:

integrating the horizontal synchronization signals and the vertical synchronization signal with the blank data and the output display data to be comprised in the second interface image signal to be outputted by the transmission circuit.

15. An image conversion apparatus having timing reconstruction mechanism, comprising:

a receiving circuit configured to receive a first interface image signal through a first interface, wherein the first interface image signal comprises input display data and a plurality of horizontal blanking signals;

a horizontal synchronization reconstruction circuit configured to generate a plurality of horizontal synchronization signals according to timings of the horizontal blanking signals;

a vertical synchronization reconstruction circuit configured to select a predetermined timing of a predetermined signal between a frame initial timing and a display initial timing of the input display data, to determine a timing of one of the horizontal synchronization signals that is behind and closest to the predetermined timing and generate a vertical synchronization signal accordingly;

an image reconstruction circuit configured to generate output display data according to the input display data and the horizontal synchronization signals, wherein the output display data comprises a plurality of output line data, each of the horizontal synchronization signals has a starting edge and a signal time length, each of the horizontal synchronization signals has a front porch time length and a back porch time length, and the image reconstruction circuit is further configured to:

configure the vertical synchronization signal as a starting point to start to output the plurality of output line data each corresponding to one of the horizontal synchronization signals;

configure an output time point of each of the plurality of output line data to have a first difference from the starting edge of a corresponding one of the horizontal synchronization signals, in which the first difference is a sum of the signal time length and the back porch time length; and configure an ending time point of each of the plurality of output line data to have a second difference from the starting edge of a next one of the horizontal synchronization signals, in which the second difference equals the front porch time length; and a transmission circuit configured to, according to the timings of the horizontal synchronization signals and the vertical synchronization signal, integrate the horizontal synchronization signals and the vertical synchronization signal with the output display data such that an integrated result is comprised in a second interface image signal to be outputted through a second interface.

* * * * *